United States Patent
Hosokawa et al.

(10) Patent No.: US 11,001,754 B2
(45) Date of Patent: May 11, 2021

(54) METHOD OF PRODUCING NITRIDE FLUORESCENT MATERIAL, AND NITRIDE FLUORESCENT MATERIAL

(71) Applicant: NICHIA CORPORATION, Anan (JP)

(72) Inventors: Shoji Hosokawa, Tokushima (JP); Daiki Kuramoto, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 16/790,049

(22) Filed: Feb. 13, 2020

(65) Prior Publication Data

US 2020/0181489 A1 Jun. 11, 2020

Related U.S. Application Data

(63) Continuation of application No. 15/717,232, filed on Sep. 27, 2017, now Pat. No. 10,604,701.

(30) Foreign Application Priority Data

Sep. 29, 2016 (JP) .................................. 2016-191365
Sep. 21, 2017 (JP) .................................. 2017-181561

(51) Int. Cl.
  *C09K 11/77* (2006.01)
  *C09K 11/08* (2006.01)

(52) U.S. Cl.
  CPC ...... *C09K 11/7734* (2013.01); *C09K 11/0883* (2013.01)

(58) Field of Classification Search
  CPC .................... C09K 11/0883; C09K 11/7734
  See application file for complete search history.

(56) References Cited

U.S. PATENT DOCUMENTS 9,580,649 B2 * 2/2017 Vosgroene ......... C09K 11/7734
10,604,701 B2 * 3/2020 Hosokawa ......... C09K 11/7734

FOREIGN PATENT DOCUMENTS

| JP | 2003-515655 A | 5/2003 |
| JP | 2010-185009 A | 8/2010 |
| JP | 2015-529701 A | 10/2015 |

* cited by examiner

*Primary Examiner* — C Melissa Koslow
(74) *Attorney, Agent, or Firm* — Hunton Andrews Kurth LLP

(57) ABSTRACT

A method of producing a nitride fluorescent material including a step of first heat-treating a first compound containing at least one alkaline earth metal element selected from the group consisting of Ba, Sr, Ca and Mg, a second compound containing at least one element selected from the group consisting of Eu, Ce, Tb and Mn, and a Si-containing compound, in an atmosphere containing nitrogen to obtain a calcined product of raw materials, and a step of second heat-treating the calcined product of raw materials, a Ba-containing compound, a Si-containing compound, and optionally a third compound containing at least one element selected from the group consisting of Eu, Ce, Tb and Mn, and optionally a fourth compound containing at least one alkaline earth metal element selected from the group consisting of Sr, Ca and Mg, in an atmosphere containing nitrogen to obtain a nitride fluorescent material is provided, wherein the ratio of the charge-in molar amount of Ba to the total charge-in molar amount of at least one alkaline earth metal element to be contained in the calcined product of raw materials in the step of obtaining the calcined product of raw materials is smaller than the ratio of the charge-in molar amount of Ba to the total charge-in molar amount of at least one alkaline earth metal element to be contained in the nitride fluorescent material in the step of obtaining the nitride fluorescent material.

17 Claims, 4 Drawing Sheets

METHOD OF PRODUCING NITRIDE FLUORESCENT MATERIAL, AND NITRIDE FLUORESCENT MATERIAL

CROSS-REFERENCE TO RELATED PATENT APPLICATION

This is a continuation application of U.S. patent application Ser. No. 15/717,232, filed Sep. 27, 2017, now U.S. Pat. No. 10,604,701, which claims priority under 35 U. S. C. § 119 to Japanese Patent Application No. 2016-191365, filed Sep. 29, 2016, and Japanese Patent Application No. 2017-181561, filed on Sep. 21, 2017, the entire disclosures of which are hereby incorporated herein by references in their entirely.

BACKGROUND

Technical Field

The present disclosure relates to a method of producing a nitride fluorescent material, and to a nitride fluorescent material.

Description of Related Art

A light emitting device including a combination of a light emitting diode (hereinafter referred to as "LED") and a fluorescent material is actively applied to backlights for lighting devices and liquid-crystal display devices and to compact-size strobes, etc., and is being much popularized. In order to emit light containing red color from such a light emitting device, a fluorescent material having an emission peak wavelength in a wavelength range of 570 nm or more and 670 nm or less is desired as the fluorescent material.

As such a fluorescent material, for example, in Japanese Unexamined Patent Publication No. 2003-515655 discloses a nitride fluorescent material containing $(Ba,Sr,Ca)_2Si_5N_8$ as the mother crystal and a divalent europium ($Eu^{2+}$) as the activator element.

SUMMARY

However, in the production method for a nitride fluorescent material having the composition mentioned above, it tends to be difficult to obtain a nitride fluorescent material having a large particle size and a good particle shape at a high yield.

Given the situation, one aspect of the present disclosure is to provide a method for producing a nitride fluorescent material having a large particle size and a good particle shape at a high yield, and to provide a nitride fluorescent material.

A means for solving the above-mentioned problems is as mentioned below, and the present disclosure includes the following embodiments.

A first embodiment of the present disclosure is a method of producing a nitride fluorescent material, including first heat-treating a first compound containing at least one alkaline earth metal element selected from the group consisting of Ba, Sr, Ca and Mg, a second compound containing at least one element selected from the group consisting of Eu, Ce, Tb and Mn, and an Si-containing compound, in an atmosphere containing nitrogen atmosphere to obtain a calcined product of raw materials, and second heat-treating the calcined product of raw materials, a Ba-containing compound, an Si-containing compound, and optionally a third compound containing at least one element selected from the group consisting of Eu, Ce, Tb and Mn, and optionally a fourth compound containing at least one alkaline earth metal element selected from the group consisting of Sr, Ca and Mg, in an atmosphere containing nitrogen to obtain a nitride fluorescent material, wherein:

the ratio of the charge-in molar amount of Ba to the total charge-in molar amount of at least one alkaline earth metal element to be contained in the calcined product of raw materials in the step of obtaining the calcined product of raw materials is smaller than the ratio of the charge-in molar amount of Ba to the total charge-in molar amount of at least one alkaline earth metal element to be contained in the nitride fluorescent material in the step of obtaining the nitride fluorescent material.

A second embodiment of the present disclosure is a nitride fluorescent material having a composition containing Ba; at least one alkaline earth metal element selected from the group consisting of Ca, Sr and Mg; at least one element selected from the group consisting of Eu, Ce, Tb and Mn; Si; and N, wherein the ratio (N/Dm2) of a mean particle size (N) of the nitride fluorescent material measured according to a FSSS method to a volume-average particle size (Dm2) of the nitride fluorescent material according to a laser diffraction scattering particle size distribution measuring method (N/Dm2) is in a range of 0.75 or more and 1.00 or less.

According to embodiments of the present disclosure, there can be provided a method for producing a nitride fluorescent material having a large particle size and a good particle shape at a high yield, and a nitride fluorescent material.

DETAILED DESCRIPTION

Figure 1:
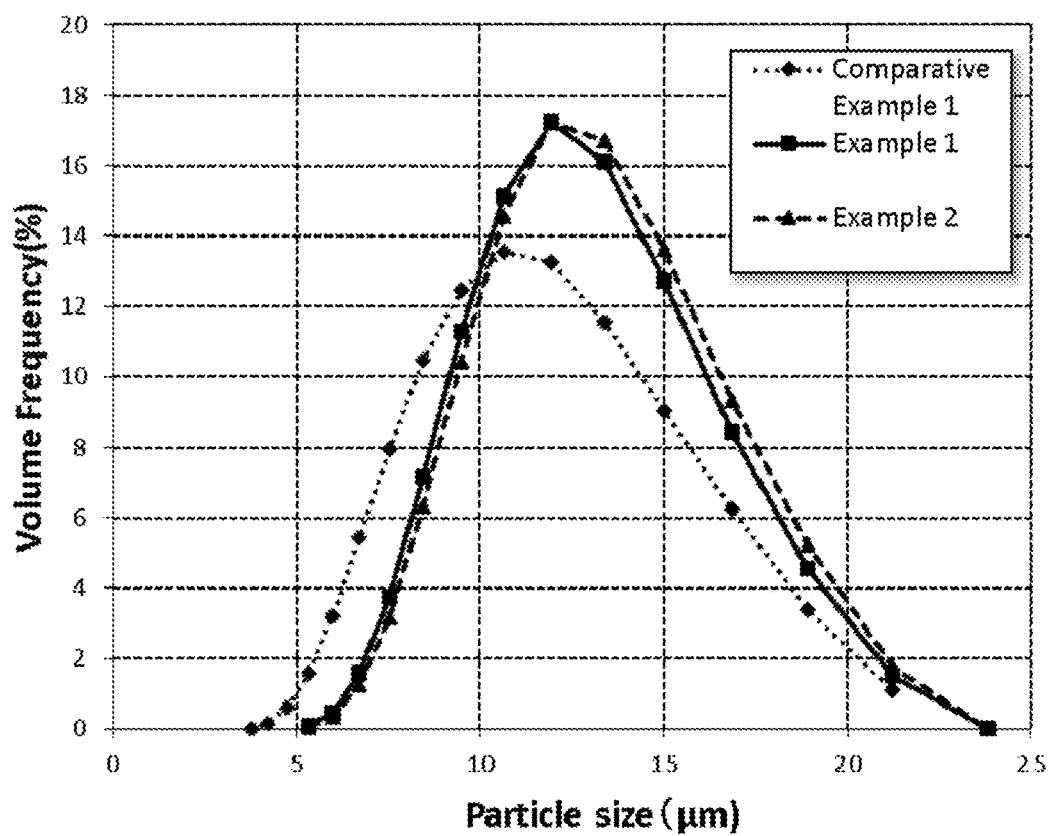
FIG. 1 is a diagram showing a volume-based particle size distribution of the nitride fluorescent material of Example 1 and Example 2 and that of Comparative Example 1.

The production method of a nitride fluorescent material of the present disclosure is described hereinunder with reference to embodiments thereof. However, the embodiments shown below are for exemplifying the method of producing a nitride fluorescent material and nitride fluorescent material for the purpose of embodying the technical ideal of the present invention, and therefore the present invention is not limited to the embodiments of the method for producing a nitride fluorescent material and the nitride fluorescent material shown below. The relationship between the color name and the chromaticity coordinate, and the relationship between the wavelength range of light and the color name of monochromatic light follow JIS Z8110.

Method of Producing Nitride Fluorescent Material

The method of producing a nitride fluorescent material of an embodiment of the present disclosure includes a step of first heat-treating a first compound containing at least one alkaline earth metal element selected from the group consisting of Ba, Sr, Ca and Mg, a second compound containing at least one element selected from the group consisting of Eu, Ce, Tb and Mn, and an Si-containing compound, in an atmosphere containing nitrogen to obtain a calcined product of raw materials, and a step of second heat-treating the calcined product of raw materials, a Ba-containing compound, an Si-containing compound, and optionally a third compound containing at least one element selected from the group consisting of Eu, Ce, Tb and Mn, and optionally a fourth compound containing at least one alkaline earth metal element selected from the group consisting of Sr, Ca and Mg, in an atmosphere containing nitrogen to obtain a nitride fluorescent material, wherein the ratio of the charge-in molar amount of Ba to the total charge-in molar amount of at least one alkaline earth metal element to be contained in the calcined product of raw materials in the step of obtaining the calcined product of raw materials is smaller than the ratio of the charge-in molar amount of Ba to the total charge-in molar amount of at least one alkaline earth metal element to be contained in the nitride fluorescent material in the step of obtaining the nitride fluorescent material.

Step of Obtaining Calcined Product of Raw Materials

In the step of obtaining the calcined product of raw materials, a first compound containing at least one alkaline earth metal element selected from the group consisting of Ba, Sr, Ca and Mg, a second compound containing at least one element selected from the group consisting of Eu, Ce, Tb and Mn, and an Si-containing compound are first heat-treated in an atmosphere containing nitrogen to obtain a calcined product of raw materials.

In the method of producing a nitride fluorescent material of the embodiment of the present disclosure, the raw materials are so mixed that the ratio (B1) of the charge-in molar amount of Ba to the total charge-in molar amount of at least one alkaline earth metal element to be contained in obtaining the calcined product of raw materials (hereinafter this may be referred to as "the ratio (B1) of the charge-in molar amount of Ba") is smaller than the ratio (B2) of the charge-in molar amount of Ba to the total charge-in molar amount of at least one alkaline earth metal element to be contained in obtaining the nitride fluorescent material having the intended composition (hereinafter this may be referred to as "the ratio (B2) of the charge-in molar amount of Ba"). In the case where Ba is not used in the step of obtaining the calcined product of raw materials, the ratio of the charge-in molar amount of Ba (B1) is zero.

When the ratio of the charge-in molar amount of Ba (B1) is smaller than the ratio of the charge-in molar amount of Ba (B2), the calcined product of raw materials is obtained in a state of promoted crystal growth having high reactivity, and the particle size thereof is large and the particle shape thereof is good.

Ba tends to scatter more at a high temperature than any other element in the mixture of raw materials. In addition, the reactivity of Ba tends to be lower than the reactivity of any other element. Owing to the properties of Ba, a nitride fluorescent material containing a relatively large amount of Ba obtained according to a conventional production method tends to have an uneven particle size. Even though the particle size thereof is tried to be unified in some degree by classification, such a nitride fluorescent material may contain secondary particles formed through aggregation of fine particles, or may contain particles formed by adhesion of fine particles to large particles.

By the method for producing a nitride fluorescent material according to an embodiment of the present disclosure, a calcined product of raw materials whose composition differs from that of the final nitride fluorescent material having an intended composition is produced. The ratio of the charge-in molar amount of Ba (B1) is smaller than the ratio of the charge-in molar amount of Ba (B2). In that manner, in the calcined product of raw materials, the molar ratio of Ba is controlled, and therefore the particle size thereof is large and the particle shape thereof is good. The composition of raw materials is mixed with other raw materials so as to obtain an intended composition, and is again calcined to obtain a final nitride fluorescent material. The calcined product of raw materials naturally has a large particle size and a good particle shape, and therefore the nitride fluorescent material having the intended composition can also have a large particle size and a good particle shape and the yield thereof can be high.

In the present disclosure, the term "the particle shape of the nitride fluorescent material is good" means that the content of secondary particles formed through aggregation of fine particles is small and the content of primary particles is large. In addition, in the present disclosure, the term "the particle shape of the nitride fluorescent material is good" means that fine particles do not adhere to the surfaces of particles and that the surfaces of the particles are smooth.

In the present disclosure, the total molar amount of the alkaline earth metal elements contained in the calcined product of raw materials, and the molar amount of Ba contained in the calcined product of raw materials are not the molar amount shown by the compositional ratio in the resultant calcined product of raw materials, but are the molar amount in the charge-in composition before production of the calcined product of raw materials.

The total molar amount of the alkaline earth metals in the nitride fluorescent material and the molar amount of Ba in the nitride fluorescent material are not the molar amount shown by the compositional ratio of the resultant nitride fluorescent material, but are the molar amount in the charge-in composition of the calcined products of raw materials and other compounds to be the raw materials for producing the nitride fluorescent material having an intended composition.

In this description, whether or not the particle shape is good and the content of secondary particles formed through aggregation of fine particles is small may be confirmed by calculating the ratio of the mean particle size (N: Fisher sub-sieve sizer's number) measured according to a Fisher sub-sieve sizer (FSSS) method to the volume-average particle size (Dm2) measured according to a laser diffraction scattering particle size distribution measuring method (N/Dm2).

The laser diffraction scattering particle size distribution measuring method is a method of measuring a particle size irrespective of primary particles and secondary particles, using the scattered light of a laser light applied to particles.

On the other hand, the FSSS method is a type of an air permeation method, and is a method of measuring the particle size of primary particles using flow resistance of air.

When the ratio (N/Dm2) of the mean particle size (N) of fluorescent particles measured according to the FSSS method to the volume-average particle size (Dm2) measured according to the laser diffraction scattering particle size distribution measuring method is closer to 1, it may be confirmed that the content of secondary particles is smaller and the content of primary particles is larger.

Whether or not the surfaces of particles are smooth may be confirmed, for example, by observing the appearances of particles on a SEM micrograph to determine whether or not fine particles do not adhere to the surfaces of the particles and the surfaces of the particles are smooth.

In the production method for a fluorescent material of this embodiment, preferably, the ratio (B1) of the charge-in molar amount of Ba to the total charge-in molar amount of the alkaline earth metal elements to be contained in the calcined product of raw material is in a range of 0 or more and less than 0.3, and the ratio (B2) of the charge-in molar amount of Ba to the total charge-in molar amount of the alkaline earth metal elements to be contained in the nitride fluorescent material is in a range of 0.3 or more and less than 1.0.

The ratio (B1) of the charge-in amount of Ba is smaller than the ratio (B2) of the charge-in molar amount of Ba, and when the ratio (B1) of the charge-in molar amount of Ba is in a range of 0 or more and less than 0.3 relative to the total charge-in molar amount of the alkaline earth metal elements to be contained in the calcined product of raw materials, the reactivity of the calcined product of raw materials is high, the crystal growth is promoted, and as a result, the particle size of the nitride fluorescent material to be obtained finally tends to be large and the particle shape thereof tends to be good.

The ratio (B1) of the charge-in molar amount of Ba is more preferably 0.28 or less relative to the total charge-in molar amount of the alkaline earth metal elements to be contained in the calcined product of raw materials, more preferably 0.26 or less, even more preferably 0.24 or less. The calcined products of raw materials may not contain a Ba element, but from the viewpoint of the stability of the crystal structure of the calcined product of raw materials, the ratio (B1) of the charge-in molar amount of Ba is preferably 0.01 or more relative to the total charge-in molar amount of the alkaline earth metal elements to be contained in the calcined product of raw materials.

The ratio (B2) of the charge-in molar amount of Ba is, from the viewpoint of the stability of crystal structure, preferably 0.3 or more and less than 1.0 relative to the total molar amount of the alkaline earth metals to be contained in the nitride fluorescent material, more preferably 0.4 or more and 0.95 or less, even more preferably 0.5 or more and 0.90 or less.

In the step of preparing the calcined product of raw materials, the first compound containing at least one alkaline earth metal element selected from the group consisting of Ba, Sr, Ca and Mg is a compound containing an element to be the skeleton of constituting the crystal structure of the calcined product of raw materials. In the production method of this aspect, the calcined product of raw materials to be prepared preferably contains Sr. The calcined product of raw materials may not contain Ba, but from the viewpoint of the stability of crystal structure, the ratio (B1) of the molar amount of Ba is preferably 0.01 or more relative to the total molar amount of the alkaline earth metal elements to be contained in the calcined product of raw materials.

In the step of preparing the calcined product of raw materials, the second compound containing at least one element selected from the group consisting of Eu, Ce, Tb and Mn is a compound containing an activator element to be the emission center of the resultant nitride fluorescent material. The calcined product of raw materials to be prepared in the production method of this embodiment preferably contains at least one element selected from Eu and Ce, and more preferably contains Eu. Europium (Eu) has an energy level mainly at 2-valence and 3-valence, and the nitride fluorescent material to be obtained in the production method of this embodiment preferably uses $Eu^{2+}$ as the activator element.

Regarding the second compound containing an activator element in the production method of this embodiment, the resultant nitride fluorescent material may contain one kind alone of an activator element or may contain two or more kinds of activator elements so far as the method can give a nitride fluorescent material having a sufficient emission intensity and the nitride fluorescent material can absorb excitation light to emit light at a desired chromaticity. In addition, in the production method of this embodiment, the second compound to be used may be a compound containing one kind of an activator element alone, or may be a second compound containing two kinds of activator elements, or may also be a combination of two kinds of second compounds each containing a different activator element. In the production method of this embodiment, when the resultant nitride fluorescent material contains, for example, two kinds of activator elements where one kind of activator element is Eu and the other activator element is at least one element selected from the group consisting of Ce, Tb and Mn, the other element than Eu may act as a co-activator to change the color of the nitride fluorescent material.

In the production method of a nitride fluorescent material of this embodiment, the compounds are preferably heat-treated in order that the calcined product of raw materials has a charge-in composition represented by the following formula (I):

$$(Sr_q M1_s M2_t)_2 Si_5 N_8 \tag{I}$$

wherein M1 represents at least one alkaline earth metal element selected from the group consisting of Ba, Ca and Mg, M2 represents at least one element selected from the group consisting of Eu, Ce, Tb and Mn, and q, s and t each are numbers satisfying $0.600 \le q \le 0.999$, $0 \le s \le 0.3$, $0.001 \le t \le 0.100$, and $0.9 < q+s+t \le 1.0$.

In the formula (I), twice of the parameter q is the molar compositional ratio of Sr, twice of the parameter s is the molar compositional ratio of at least one alkaline earth metal element selected from the group consisting of Ba, Ca and Mg. In the formula (I), from the viewpoint of the stability of crystal structure, M1 preferably contains Ba.

In the formula (I), when the parameter q is a number satisfying $0.600 \le q \le 0.999$ and when the parameter s is a number satisfying $0 \le s \le 0.3$, a calcined product of raw materials having high reactivity in the step of producing a nitride fluorescent material to be described below can be prepared.

In the formula (I), the parameter q is more preferably a number satisfying $0.700 \le q \le 0.980$, even more preferably $0.750 \le q \le 0.950$. In the formula (I), the parameter s is more preferably a number satisfying $0.01 \le s \le 0.28$, even more preferably $0.02 \le s \le 0.26$, still more preferably $0.03 \le s \le 0.24$.

In the formula (I), twice of the parameter t is the molar compositional ratio the activator element of at least one element selected from the group consisting of Eu, Ce, Tb and Mn. When the parameter t is a number satisfying $0.001 \le t \le 0.100$, a nitride fluorescent material having a sufficient emission intensity even though a compound containing an element to be an activator is not added and capable of emitting a light having a desired chromaticity by the light from an excitation light source having a desired emission peak wavelength can be produced in the step of producing a nitride fluorescent material to be described below.

In the formula (I), the parameter t is more preferably a number satisfying $0.001 \le t \le 0.090$, even more preferably $0.002 \le t \le 0.080$, still more preferably $0.003 \le t \le 0.070$.

First Compound

The first compound includes nitrides, fluorides, hydrides, oxides, carbonates, chlorides containing at least one alkaline earth metal element selected from the group consisting of Ba, Sr, Ca and Mg. The first compound is preferably a nitride, a fluoride or a hydride, more preferably a nitride containing at least one alkaline earth metal element selected from the group consisting of Ba, Sr, Ca and Mg since a calcined product of raw materials having a small amount of impurities and a nitride fluorescent material having a sufficient emission intensity can be obtained. When such a nitride is used as the first compound, formation of a calcined product of raw materials having any other composition than the desired composition can be prevented. The compound containing at least one alkaline earth metal element selected from the group consisting of Ba, Sr, Ca and Mg may contain a minor amount of at least one element selected from the group consisting of Li, Na, K, B and Al.

Specifically, the first compound includes $Ba_3N_2$, $BaF_2$, $BaH_2$, $Sr_2N$, $SrN$, $Sr_3N_2$, $SrF_2$, $SrH_2$, $Ca_3N_2$, $CaF_2$, $CaH_2$, $Mg_3N_2$, $MgF_2$, $MgH_2$, etc.

Second Compound

The second compound includes nitrides, fluorides, hydrides, oxides, carbonates, chlorides containing at least one element selected from the group consisting of Eu, Ce, Tb and Mn. The second compound is preferably a nitride, a fluoride or a hydride, more preferably a nitride containing at least one element selected from the group consisting of Eu, Ce, Tb and Mn since a calcined product of raw materials having a small amount of impurities and a nitride fluorescent material having a sufficient emission intensity can be obtained. When such a nitride is used as the second compound, formation of a calcined product of raw materials having any other composition than the desired composition can be prevented.

Specifically, the second compound includes $EuN$, $EuF_3$, $EuH_3$, $CeN$, $CeF_3$, $CeH_3$, $TbN$, $TbF_3$, $TbH_3$, $MnN_2$, $MnN_5$, $MnF_2$, etc.

Si-Containing Compound

The Si-containing compound may be a metal substantially containing Si alone, or may be a Si alloy where a part of Si is substituted with at least one metal selected from the group consisting of Ge, Sn, Ti, Zr, Hf, B, Al, Ga and In. The Si-containing compound includes nitrides, oxides, imide compounds, amide compounds, etc. The compound is preferably a nitride, an imide compound or an amide compound, and is more preferably a nitride since a calcined product of raw materials having a small amount of impurities and a nitride fluorescent material having a sufficient emission intensity can be obtained. When such a nitride is used as the raw material, formation of a calcined product of raw materials having any other composition than the desired composition can be prevented.

Specifically, the Si-containing compound includes $Si_3N_4$, $SiO_2$, $Si(NH)_2$, $Si_2N_2NH$, $Si(NH_2)_4$, etc.

Raw materials containing the first compound, the second compound and the Si-containing compound preferably have a mean particle size falling within a range of about 0.1 μm or more and 15 μm or less, more preferably in a range of about 0.1 μm or more and 10 μm or less, from the viewpoint of reactivity with other raw materials, and from the viewpoint of particle size control during heat treatment or after heat treatment. The particle size falling within the above range of each raw material can be attained by grinding the raw material.

Preferably, the raw materials are purified ones. When purified raw materials are used, a purification step is unnecessary, and the production process can be therefore simplified and an inexpensive fluorescent material can be provided.

Flux

The raw materials are mixed to obtain a mixture of raw materials. The mixture of raw materials may contain a flux. When the mixture of raw materials contains a flux, the reaction between the raw materials can be promoted more, and further solid-phase reaction can run on more uniformly, and accordingly, a calcined product of raw materials having a large particle size and capable of being efficiently used in producing a fluorescent material having more excellent emission properties can be produced. This is considered because, for example, the temperature for the heat treatment to prepare a calcined product of raw materials is in a range of 1300° C. or higher and 2100° C. or lower, and the temperature is nearly the same as the temperature at which the flux state changes to liquid phase. A halide, such as a chloride, a fluoride of a rare earth metal, an alkaline earth metal or an alkali metal can be used. Regarding the flux, a part of the raw materials for the nitride fluorescent material may be adequately controlled so that the element ratio of the cation contained in the flux corresponds to the composition of the desired calcined product of raw materials and may be added as the flux, or after raw materials are mixed to have the desired composition of a calcined product of raw materials, and a flux may be further added thereto.

In the case where the mixture of raw materials contains a flux, the flux component may accelerate the reactivity, but when the content thereof is too much, it may lower the emission intensity. Consequently, the content is, for example, preferably 10% by mass or less in the mixture of raw materials, more preferably 5% by mass or less.

Even in the case where a fluoride is used as the flux, the fluorine element may not almost remain in the calcined product owing to heat treatment in a range of 1300° C. or higher and 2100° C. or lower, and even in the case where a fluorine element-containing flux is used, the fluorine element in the resultant calcined product after the heat treatment is generally 0.1% by mass or less, preferably 0.08% by mass or less.

In the case where a calcined product of raw materials having the composition shown by the above-mentioned formula (I) is prepared, preferably, the raw materials are so metered that the molar amount of Sr, the molar amount of M1, the molar amount of M2, the molar amount of Si and the molar amount of N in the mixture of the raw materials satisfy a molar ratio of Sr:M1:M2:Si:N=(1.200 to 1.998)(0 to 0.600):(0.002 to 0.200):5:8, as one example of the intended composition.

Mixture of Raw Materials

The metered raw materials are mixed in wet or in dry, using a mixing machine to prepare a mixture of raw materials. As the mixing machine, not only a ball mill that is generally used for industrial purpose, but also any other grinding machine such as a vibration mill, a roll mill, a jet mill may be used to grind them to enlarge the specific surface area thereof. For controlling the specific surface area of the powder to fall within a predetermined range, the powder may be classified using a wet-process separator such as a precipitation tank, a hydrocyclone, a centrifuge or the like, or a dry-process classifier such as an cyclone, an air separator or the like that is generally used for industrial purpose.

The mixture of raw materials may be set in a crucible or a boat formed of carbon such as graphite, or boron nitride (BN), alumina ($Al_2O_3$), tungsten (W), molybdenum (Mo), and heat-treated in a furnace to obtain a calcined product thereof.

First Heat Treatment

In the production method of a nitride fluorescent material of the embodiment of the present disclosure, the raw materials are first heat-treated in an atmosphere containing nitrogen to obtain a calcined product of raw materials. The atmosphere for heat treatment may be an atmosphere containing nitrogen. The atmosphere containing nitrogen preferably contains nitrogen in an amount of 70% by volume or more, more preferably 80% by volume or more, even more preferably 90% by volume or more. The atmosphere containing nitrogen is preferably a reductive atmosphere. The reductive atmosphere is more preferably an atmosphere containing a reductive hydrogen gas. The reductive atmosphere containing nitrogen and hydrogen gas preferably contains a hydrogen gas in an amount of 1% by volume or more, more preferably 5% by volume or more, even more preferably 10% by volume or more.

In the production method of this embodiment, a mixture of raw materials can be heat-treated in an atmosphere containing nitrogen to prepare a calcined product of raw materials, which is for producing a desired nitride fluorescent material. In the case where the atmosphere is an atmosphere containing nitrogen and a reductive hydrogen gas, a calcined product of raw materials capable of producing a nitride fluorescent material having a higher emission intensity can be prepared. This is because, for example, in the case where the activator is Eu, the proportion of the divalent Eu that contributes toward light emission increases in the calcined product of raw materials. The divalent Eu may be readily oxidized to be a trivalent Eu, but when the raw materials are calcined in a reductive atmosphere containing hydrogen and nitrogen and having a high reductive power, the trivalent Eu is reduced into a divalent Eu, and therefore the proportion of the divalent Eu increases and a calcined product of raw materials capable of forming a nitride fluorescent material having a high emission intensity can be produced.

The heat treatment temperature for obtaining the calcined product of raw materials is preferably in a range of 1300° C. or higher and 2100° C. or lower, more preferably in a range of 1500° C. or higher and 2000° C. or lower, even more preferably in a range of 1600° C. or higher and 1950° C. or lower. When the heat treatment temperature is in a range of 1300° C. or higher and 2100° C. or lower, the thermal decomposition may be prevented and a calcined product of raw materials for producing a fluorescent material having the intended composition, having a stable crystal structure and having a sufficient emission intensity can be obtained.

The first heat treatment may be multistage heat treatment of two stages or more. For example, in the case of two-stage heat treatment, preferably, the first stage heat treatment is carried out at a temperature falling within a range of 1000° C. or lower and lower than 1500° C., and the second stage heat treatment is at a temperature falling within a range of 1500° C. or higher and 2100° C. or lower. When the temperature of the first stage heat treatment is in a range of 1000° C. or lower and lower than 1500° C., a calcined product of raw materials having an intended composition is readily obtained. When the temperature of the second stage heat treatment is in a range of 1500° C. or higher and 2100° C. or lower, the resultant calcined product of raw materials can be prevented from being decomposed and therefore a calcined product of raw materials having a stable crystal structure and capable of giving a nitride fluorescent material having a sufficient emission intensity can be readily prepared.

The pressure of the atmosphere containing nitrogen is, as a gauge pressure, preferably an increased pressure in a range of 0.1 MPa or more and 200 MPa or less. In the calcined product of raw materials to be obtained through heat treatment, the crystal structure is readily decomposed when the heat treatment temperature is higher, but in an increased pressure atmosphere, the decomposition of the crystal structure can be prevented and the emission intensity can be prevented from lowering. The pressure of the heat treatment atmosphere is, as a gauge pressure, preferably in a range of 0.1 MPa or more and 100 MPa or less, more preferably in a range of 0.5 MPa or more and 10 MPa or less, and from the viewpoint of easiness in production, the pressure is even more preferably 1.0 MPa or less.

The first heat treatment time may be adequately selected depending on the heat treatment temperature, and the pressure of the atmosphere in heat treatment, and is preferably in a range of 0.5 hours or more and 20 hours or less. Even in the case of multistage heat treatment, the time of one heat treatment is preferably in a range of 0.5 hours or more and 20 hours or less. When the heat treatment time is 0.5 hours or more and 20 hours or less, the resultant calcined product can be prevented from being decomposed, and a calcined product having a stable crystal structure and capable of giving a fluorescent material having a sufficient emission intensity can be prepared, and in addition, the production cost can be reduced and the production time can be relatively shortened. The heat treatment time is more preferably in a range of 1 hour or more and 10 hours or less, even more preferably in a range of 1.5 hours or more and 9 hours or less.

Post Treatment Step after First Heat Treatment

In the production method of this embodiment, the resultant calcined product of raw materials may be, after heat treatment, processed for post treatment of grinding, wet-process dispersion, solid-liquid separation, drying, classification, etc. The solid-liquid separation may be carried out according to an ordinary industrial process of filtration, suction filtration, pressure filtration, centrifugation, decantation, etc. The drying may be carried out using an ordinary industrial apparatus such as a vacuum drier, a hot air heating drier, a conical drier, a rotary evaporator, etc. The classification may be carried out according to an ordinary industrial process of wet-method classification such as precipitation classification, mechanical classification, hydraulic classification, centrifugal classification or the like, or screening classification, etc.

The calcined product of raw materials to be prepared in the production method of this embodiment preferably has a structure of high crystallinity at least in a part thereof. For example, a glassy substance (amorphous substance) has an irregular structure and has low crystallinity, and therefore unless the reaction condition in the production process is strictly uniformly controlled, the light emitting device using the resultant nitride fluorescent material tends to provide chromaticity unevenness. The calcined product of raw materials to be prepared in the production method of this embodiment preferably has a structure having high crystallinity at least in a part thereof. The calcined product of raw materials having a structure with high crystallinity at least in a part thereof tends to facilitate production and processing.

In the production method of this embodiment, the calcined product of raw materials preferably has a volume-average particle size (Dm1) in a range of 5.0 µm or ore and 20.0 µm or less, as measured according to a laser diffraction scattering particle size distribution measuring method. The volume-average particle size (Dm1) is more preferably in a range of 5.5 µm or more and 19.0 µm or less, even more preferably in a range of 6.0 µm or more and 18.0 µm or less, still more preferably in a range of 6.5 µm or more and 17.0 µm or less. When the volume-average particle size (Dm1) of the calcined product of raw materials falls within the above range, the reactivity of the resultant calcined product of raw materials can be high in the subsequent step of producing a nitride fluorescent material, and therefore, a nitride fluorescent material having a desired particle size can be obtained and a nitride fluorescent material having a uniform particle shape can be obtained.

The mean particle size (N1), as measured according to the FSSS method, of the calcined product of raw materials is preferably 4.0 µm or more, more preferably 4.5 µm or more, even more preferably 5.0 µm or more, and is preferably 20.0 µm or less.

In the production method of this embodiment, the calcined product of raw materials whose volume-average particle size is measured according to a laser diffraction scattering particle size distribution measuring method may be one from which coarse particles having a particle size of more than 50.0 µm and fine particles having a particle size of less than 1.0 µm are removed through classification, etc. Even in the case where such coarse particles and fine particles are removed, in the nitride fluorescent material obtained according to the production method of this embodiment, the crystals grow largely, and the content of primary particles is high, and consequently a nitride fluorescent material having a large particle size and having a good particle shape can be produced at a high yield.

Step of Producing Nitride Fluorescent Material

The method for producing a nitride fluorescent material of the embodiment of the present disclosure includes a step of heat-treating the calcined product of raw materials, a Ba-containing compound, an Si-containing compound, and optionally a third compound containing at least one element selected from the group consisting of Eu, Ce, Tb and Mn, and optionally a fourth compound containing at least one alkaline earth metal selected from the group consisting of Sr, Ca and Mg, in an atmosphere containing nitrogen to obtain a nitride fluorescent material.

The ratio (B1) of the charge-in molar amount of Ba to the total charge-in molar amount of the alkaline earth metal element to be contained in the calcined product of raw materials is, for the purpose of realizing the composition of the intended nitride fluorescent material, smaller than the ratio (B2) of the charge-in molar amount of Ba to the total charge-in molar amount of the alkaline earth metal element to be contained in the mixture of the calcined product of raw materials and other compounds. Consequently, by heat-treating the calcined product of raw materials and at least a Ba-containing compound in an atmosphere containing nitrogen atmosphere, the calcined product of raw materials having high reactivity can be supplemented with Ba that is insufficient in the composition of the intended nitride fluorescent material and crystal growth can be promoted, and thereby the particle size of the nitride fluorescent material to be obtained can be enlarged and the particle shape thereof can be improved.

Ba-Containing Compound

In the production method of this embodiment, the Ba-containing compound to be heat-treated along with the calcined product of raw materials includes, like the Ba-containing compound used in the step of preparing the calcined product of raw materials, Ba-containing nitrides, fluorides, hydrides, oxides, carbonates, chlorides, etc. The compound is preferably a Ba-containing nitride, fluoride or hydride, more preferably a Ba-containing nitride since a small amount of impurities and a nitride fluorescent material having a sufficient emission intensity can be obtained. When a Ba-containing nitride is used, formation of a calcined product of raw materials having any other composition than the desired composition can be prevented. Specifically, the Ba-containing compound includes $Ba_3N_2$, $BaF_2$, $BaH_2$, etc.

Third Compound, Fourth Compound, Si-Containing Compound

In the step of producing a nitride fluorescent material by heat-treating the calcined product of raw materials and a Ba-containing compound in the production method of this aspect, an Si-containing compound and optionally a third compound and optionally a fourth compound may be used.

As the Si-containing compound, the same one as the Si-containing compound to be used in the step of preparing the calcined product of raw materials is preferably used.

As the third compound, the same one as the second compound to be used in the step of preparing the calcined product of raw materials is preferably used.

As the fourth compound, the same one as the first compound to be used in the step of preparing the calcined product of raw materials but excepting a Ba-containing compound is preferably used.

Preferably, the Ba-containing compound, the Si-containing compound, the third compound and the fourth compound each have a mean particle size falling within a range of about 0.1 µm or more and 15 µm or less, more preferably within a range of about 0.1 µm or more and 10 µm or less. For the Ba-containing compound, the Si-containing compound, the third compound and the fourth compound, purified raw materials are preferably used. The mixture prepared by mixing the calcined product of raw materials and at least a Ba-containing compound may contain a flux. As the flux, the flux used in the step of preparing the calcined product of raw materials may be used.

The nitride fluorescent material obtained according to the production method of this embodiment preferably has a composition represented by the formula (II) to be mentioned hereinunder.

In the case where the calcined product of raw materials and at least a Ba-containing compound are mixed to produce a nitride fluorescent material in the production method of this embodiment, preferably, the raw materials and at least a Ba-containing compound and optionally the other compounds are so metered that the molar amount of Ba, the molar amount of Sr, the molar amount of M3, the molar amount of M2, the molar amount of Si and the molar amount of N in the mixture of the raw materials and at least the Ba-containing compound and optionally the other compounds satisfy a molar ratio of Ba:Sr:M3:M2:Si:N=(0.600 to 1.998):(0.200 to 1.400(0 to 1.200(0.002 to 0.200:5:8, as one example of the intended composition.

Mixing

For mixing the calcined product of raw materials and at least the Ba-containing compound is preferably carried out using the apparatus used in the step of preparing the calcined product of raw materials.

Second Heat Treatment

The heat treatment of the mixture prepared by mixing the calcined product of raw materials and at least the Ba-containing compound is preferably carried out in the atmosphere containing nitrogen, at the first heat treatment temperature and under the first heat treatment condition in the step of preparing the calcined product of raw materials.

Post Treatment Step after Second Heat Treatment

In the production method for a nitride fluorescent material of this aspect, the resultant nitride fluorescent material may be post-treated for wet-process dispersion, solid-liquid separation, drying, classification or the like, after the heat treatment. The solid-liquid separation may be carried out according to an ordinary industrial method of filtration, suction filtration, pressure filtration, centrifugation, decantation, etc. The drying may be carried out using an apparatus generally used in an industrial scale, such as a vacuum drier, a hot air heating drier, a conical drier, a rotary evaporator, etc. The classification may be carried out according to an ordinary industrial method of wet-process classification such as precipitation classification, mechanical classification, hydraulic classification, centrifugal classification, etc., or sieving classification, etc.

Nitride Fluorescent Material

The nitride fluorescent material of an embodiment of the present disclosure is a nitride fluorescent material having a composition containing Ba, at least one alkaline earth metal element selected from the group consisting of Ca, Sr and Mg, at least one element selected from the group consisting of Eu, Ce, Tb and Mn, and Si and N, wherein the ratio (N/Dm2) of a mean particle size (N) of the nitride fluorescent material measured according to the FSSS method to a volume-average particle size (Dm2) of the nitride fluorescent material according to a laser diffraction scattering particle size distribution measuring method is in a range of 0.75 or more and 1.00 or less.

Preferably, the nitride fluorescent material of this embodiment is one produced according to the production method for a nitride fluorescent material of one embodiment of the present invention.

Regarding the nitride fluorescent material of the embodiment of the present disclosure, the ratio (N/Dm2) of the mean particle size (N) of the nitride fluorescent material measured according to the FSSS method to the volume-average particle size (Dm2) thereof according to a laser diffraction scattering particle size distribution measuring method is in a range of 0.75 or more and 1.00 or less, preferably in a range of 0.76 or more and 0.99 or less, more preferably in a range of 0.77 or more and 0.98 or less. When the ratio (N/Dm2) falls within the above range, it is confirmed that the content of secondary particles is small, the content of primary particles is large and the particle shape is good. When the ratio N/Dm2 is a numerical value close to 1, it is known that the difference in the numerical value of the mean particle size of the nitride fluorescent material measured according to both measurement methods of a laser diffraction scattering particle size distribution measuring method and the FSSS method is small, the content of secondary particles formed through aggregation of fine particles is small and the content of primary particles is large. When the ratio N/Dm2 of the fluorescent material particles is less than 0.75, aggregated secondary particles exist along with primary particles, and it is presumed that the content of secondary particles would be large.

Preferably, coarse particles having a particle size of, for example, more than 50.0 µm and fine particles having a particle size of, for example, less than 1.0 µam are removed from the nitride fluorescent material of this aspect, through classification.

Preferably, the mean particle size (N) of the nitride fluorescent material of this aspect, as measured according to the FSSS method, is in a range of 7.0 µm or more and 20.0 µm or less, more preferably in a range of 7.5 µm or more and 19.0 µm of less, even more preferably in a range of 8.0 µm or more and 18.0 µm or less. When the mean particle size (N) falls within the range, the particle shape tends to be good.

Preferably, the volume-average particle size (Dm2), as measured according to a laser diffraction scattering particle size distribution measuring method, of the nitride fluorescent material of this embodiment is in a range of 8.0 µm or more and 20.0 µm or less, more preferably in a range of 9.0 µm or more and 19.0 µm or less, even more preferably in a range of 10.0 µm or more and 18.0 µm or less, still more preferably in a range of 10.5 µm or more and 18.0 µm or less. When the volume-average particle size (Dm2) falls within the range, the fluorescent material has a sufficient emission intensity.

Preferably, the nitride fluorescent material has a good particle shape and has a uniform particle size. When the standard deviation of the volume-based particle size distribution of the nitride fluorescent material of this embodiment, as measured, for example, according to a laser diffraction scattering particle size distribution measuring method, is a small numerical value, it is known that the full width at half maximum of the particle size distribution is narrow, the spectral profile of the particle size distribution is sharper and the particle size is uniform.

The standard deviation of the volume-based particle size distribution (olog), as measured according to a laser diffraction scattering particle size distribution measuring method, of the nitride fluorescent material of this embodiment is preferably 0.30 or less, more preferably 0.29 or less.

The nitride fluorescent material of this embodiment preferably has a composition represented by the following formula (II).

$$(Ba_vSr_wM3M2_y)_2Si_5N_{8-z} \qquad (II)$$

In the formula (II), M3 represents at least one alkaline earth metal element selected from Ca and Mg, M2 represents at least one element selected from the group consisting of Eu, Ce, Tb and Mn, and v, w, x, y and z each are numbers satisfying $0.300 \le v \le 0.899$, $0.100 \le w \le 0.700$, $0 \le x \le 0.6$, $0.001$ y $0.100$, $0.9 < v+w+x \le 1.0$, and $0 \le z \le 0.5$.

The nitride fluorescent material of this aspect may contain oxygen (O) through surface oxidation, and a part of N therein may be substituted with oxygen (O). The content of oxygen (O) in the nitride fluorescent material is preferably 0.10 mol or less as a compositional ratio, more preferably 0.08 mol or less, even more preferably 0.07 mol or less.

The nitride fluorescent material having the composition represented by the above-mentioned formula (II) is hereinafter referred to as "nitride fluorescent material (II)" for convenience sake.

In the formula (II), twice of the parameter v is the molar compositional ratio of Ba in the nitride fluorescent material (II). From the viewpoint stability of crystal structure, the parameter v is more preferably a number satisfying $0.400 \le v \le 0.890$, even more preferably a number satisfying $0.500 \le v \le 0.880$.

In the formula (II), twice of the parameter w is the molar compositional ratio of Sr in the nitride fluorescent material (II). From the viewpoint of the stability of the crystal structure of the calcined product of raw materials and from the viewpoint of reactivity with a Ba-containing compound, w is preferably a number satisfying $0.120 \le w \le 0.650$, more preferably $0.150 \le w \le 0.600$.

In the formula (II), twice of the parameter y is the activation level of the activator element of at least one element selected from the group consisting of Eu, Ce, Tb and Mn in the nitride fluorescent material (II). When the parameter y is a number satisfying $0.001 \le y \le 0.100$, a nitride fluorescent material having a sufficient emission intensity and capable of emitting a light with a desired chromaticity by the light from the excitation light source having a desired emission peak wavelength can be provided.

In the formula (II), the parameter y is more preferably a number satisfying $0.001 \leq y \leq 0.090$, even more preferably $0.002 \leq y \leq 0.080$, still more preferably $0.003 \leq y \leq 0.070$.

The nitride fluorescent material of this embodiment is activated by at least one element selected from the group consisting of Eu, Ce, Tb and Mn, preferably by europium (Eu), and absorbs a light having an emission peak wavelength in a UV to visible light region to thereby emit red. The nitride fluorescent material absorbs a light having an emission peak wavelength in a UV to visible light region of a range of 400 nm or more and 570 nm or less, and emits a light having an emission peak wavelength in a wavelength range of 570 nm or more and 670 nm or less. More preferably, the nitride fluorescent material of this embodiment has an emission peak wavelength in a wavelength range of 580 nm or more and 650 nm or less, and even more preferably has an emission peak wavelength in a wavelength range of 585 nm or more and 630 nm or less. The full width at half maximum of the emission spectrum of the nitride fluorescent material is, though not specifically limited thereto, for example, 95 nm or less, preferably 92 nm or less, more preferably 90 nm or less. A nitride fluorescent material whose full width at half maximum of the emission peak is smaller is preferred as having a higher color purity.

Preferably, the nitride fluorescent material of this embodiment has a structure having high crystallinity in at least a part thereof. For example, a glassy substance (amorphous substance) has an irregular structure and has low crystallinity, and therefore unless the reaction condition in the production process is strictly uniformly controlled, the light emitting device using the resultant nitride fluorescent material tends to provide chromaticity unevenness. The nitride fluorescent material of this embodiment preferably has a structure having high crystallinity at least in a part thereof. The nitride fluorescent material having a structure with high crystallinity at least in a part thereof tends to facilitate production and processing. In addition, the nitride fluorescent material having a structure with high crystallinity at least on a part thereof can uniformly disperse in a resin with ease, and therefore using it, a fluorescent member containing a resin can be readily produced. Specifically, it is preferable that, in the nitride fluorescent material, the proportion of the light emitting crystal phase is, for example, 50% by mass or more, and more preferably, 80% by mass or more of the fluorescent material has a crystalline structure. When the nitride fluorescent material has a crystal phase in a proportion of 50% by mass or more, the material can provide an emission intensity satisfactory for practical use.

EXAMPLES

The present invention will now be described in detail with reference to examples, but the present invention is not limited to these examples.

Production of Calcined Product of Raw Materials

A calcined product of raw materials having a composition containing Ba, Sr, Eu, Si and N was produced. Specifically, a calcined product having a composition represented by the above formula (I) was produced, containing Sr, Ba as M1 and Eu as M2. As the first compound, $Ba_3N_2$ and $SrN_u$ (u corresponds to ⅔, mixture of $Sr_2N$ and $SrN$) were used. As the second compound, EuN was used. As the Si-containing compound, $Si_3N_4$ was used.

The compounds were weighted so that the molar ratio of Sr:Ba:Eu:Si is 1.74:0.22:0.04:5.00 as the charge-in composition, in a glove box with a nitrogen atmosphere containing substantially 100% by volume of nitrogen, and mixed to prepare a mixture of raw materials. The ratio (B1) of the charge-in molar amount of Ba to the total charge-in molar amount of alkaline earth metal elements (Sr and Ba) is shown in Table 1.

The resultant calcined product of raw materials was filled a crucible, and in a nitrogen atmosphere containing substantially 100% by volume of nitrogen, this was heat-treated at 1800° C. under a gas pressure of 0.92 MPa as a gauge pressure (absolute pressure of 1.02 MPa) for 5 hours to prepare a calcined product of raw materials. In the resultant calcined product of raw materials, the particles were sintered together, and therefore, the particles were ground, classified through precipitation, and further classified by sieving through a sieve having an opening of 15 μm or so to prepare a powdery calcined product of raw material 1. The mean particle size (Dm1) according to the laser diffraction scattering particle size distribution measuring method to be mentioned below was 8.5 μm, and the standard deviation (olog) of the volume-based particle size distribution was 0.384, and the mean particle size (N1) measured according to the FSSS method to be mentioned below was 5.7 μm.

Example 1

The resultant calcined product of raw materials 1 was used. As a Ba-containing compound, $Ba_3N_2$ was used. As a Si-containing compound, $Si_3N_4$ was used. As an optional component of a third compound, EuN was used.

The calcined product of raw materials 1 and the other compounds were weighted in a glove box with a nitrogen atmosphere having substantially 100% by volume of nitrogen in such a manner that the molar ratio of Ba:Sr:Eu:Si was, as a charge-in composition, 1.800:0.400:0.040:5.000, and mixed to prepare a mixture. The ratio (B2) of the charge-in molar amount of Ba to the total charge-in molar amount of the alkaline earth metal elements (Sr and Ba) in the above charge-in composition is shown in Table 1. Also in the following Examples and Comparative Examples, the ratio (B2) of the charge-in molar amount of Ba to obtain a nitride fluorescent material having an intended composition is shown in Table 1.

The resultant mixture was filled in a crucible, and in a nitrogen atmosphere having substantially 100% by volume of nitrogen, this was heat-treated at 1800° C. under a gas pressure of 0.92 MPa as a gauge pressure (absolute pressure was 1.02 MPa) for 5 hours to produce a nitride fluorescent material. In the resultant nitride fluorescent material, the particles were often sintered together as the case may be, and therefore the particles were dispersed in wet, classified through precipitation, dewatered, dried and further classified by sieving through an opening of about 15 μm or so, to obtain a nitride fluorescent material powder 1.

Example 2

A nitride fluorescent material powder 2 was produced in the same manner as in Example 1 using the calcined product of raw materials, except that the calcined product of raw materials and the other compounds were used to have a charge-in composition of Ba:Sr:Eu:Si of 1.876:0.335:0.040:5.000 as a molar ratio.

Example 3

A nitride fluorescent material powder 3 was produced using the calcined product of raw materials, and the calcined product of raw materials and the other compounds were used to have a charge-in composition of Ba:Sr:Eu:Si of 1.250: 0.710:0.040:5.000 as a molar ratio.

Example 4

A nitride fluorescent material powder 4 was produced using the calcined product of raw materials, and the calcined product of raw materials and the other compounds were used to have a charge-in composition of Ba:Sr:Eu:Si of 1.358: 0.603:0.040:5.000 as a molar ratio.

Comparative Example 1

A nitride fluorescent material powder 5 was produced in the same manner as in Example 1, except that a calcined product of raw materials was not used but $Ba_3N_2$, SrNu (u corresponds to ⅔, mixture of $Sr_2N$ and SrN), EuN and $Si_3N_4$ were used so that the charge-in composition thereof was the same as that in Example 1.

Comparative Example 2

A nitride fluorescent material powder 6 was produced in the same manner as in Example 3, except that a calcined product of raw materials was not used but $Ba_3N_2$, SrNu (u corresponds to ⅔, mixture of $Sr_2N$ and SrN), EuN and $Si_3N_4$ were used so that the charge-in composition thereof was the same as that in Example 3.

Evaluation

The products were evaluated according to the following methods.

Volume-Average Particle Size (Dm1, Dm2)

The calcined product of raw materials, and the nitride fluorescent materials of Examples and Comparative Examples were analyzed using a laser diffraction scattering particle sizer (product name, MASTER SIZER 2000, manufactured by Malvern Corporation) to measure the mean particle size (Dm1, Dm2) that is a median diameter of volume-based cumulative frequency of 50%. In addition, the standard deviation (σlog) of the volume-based particle size distribution was measured. The results of Examples and Comparative Examples are shown in Table 1. FIG. 1 shows the volume-based particle size distribution of the nitride fluorescent materials of Examples 1 and 2 and the nitride fluorescent material of Comparative Example 1.

Mean Particle Size (N) by FSSS Method

The calcined product of raw materials, and the nitride fluorescent materials of Examples and Comparative Examples were analyzed according to the FSSS method, an air permeation method to measure F.S.S.S. No. (Fisher Sub-Sieve Sizer's No., also referred to as "FSSS mean particle size (N)"). Specifically, in an atmosphere at a temperature of 25° C. and a relative humidity of 70% RH, 1 cm³ of the sample to be analyzed was metered, packed in a dedicated tubular container, and then dry air was made to circulate therethrough under a constant pressure. From the air pressure, the specific surface area of the sample was calculated, and converted into a FSSS mean particle size (N) thereof. The results of Examples and Comparative Examples are shown in Table 1.

Composition Analysis

The nitride fluorescent materials of Examples and Comparative Examples were analyzed for composition analysis through ICP emission spectrometry using an inductively coupled plasma emission spectrometer (manufactured by Perkin Elmer Corporation) to thereby determine the content of each element (compositional ratio). The results are shown in Table 2. The numerical value shown in Table 2 is a value calculated from the results of analysis relative to the compositional ratio of Si as 5. In Table 2, the charge-in composition (molar amount) of the calcined product of raw materials, and the charge-in composition (molar amount) of the nitride fluorescent materials of Examples and Comparative Examples are additionally shown as analytical values.

SEM Image

Figure 2:
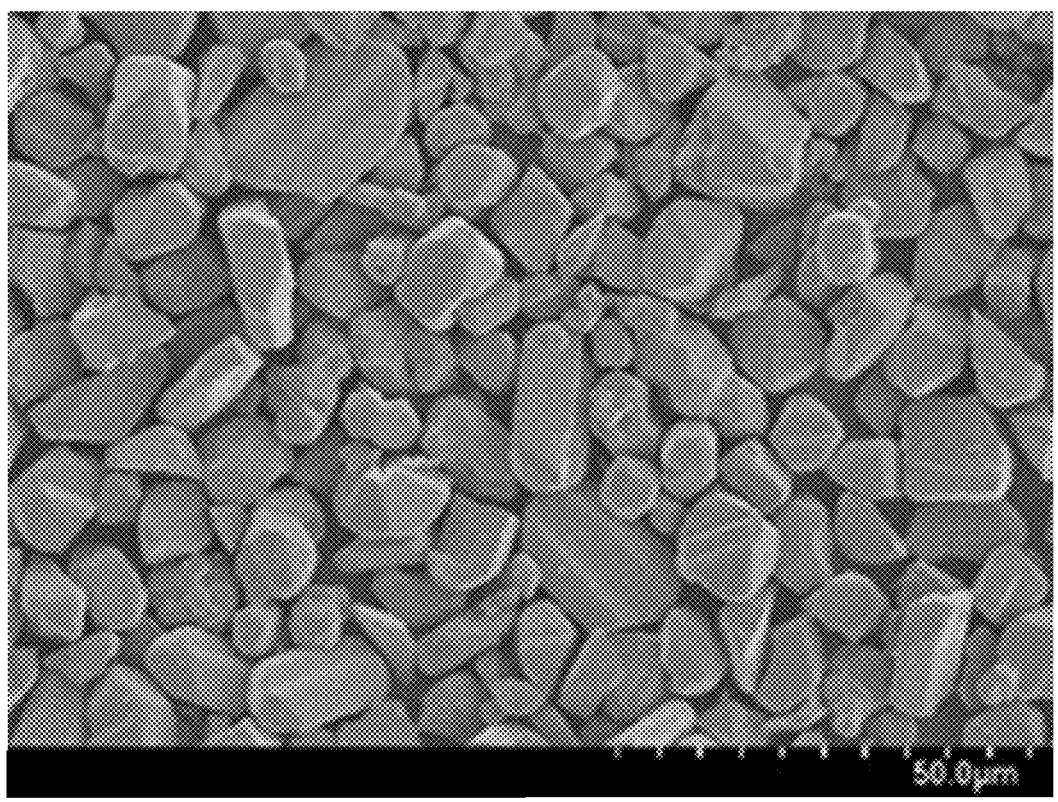
FIG. 2 is a SEM micrograph of the nitride fluorescent material of Example 1.
Figure 3:
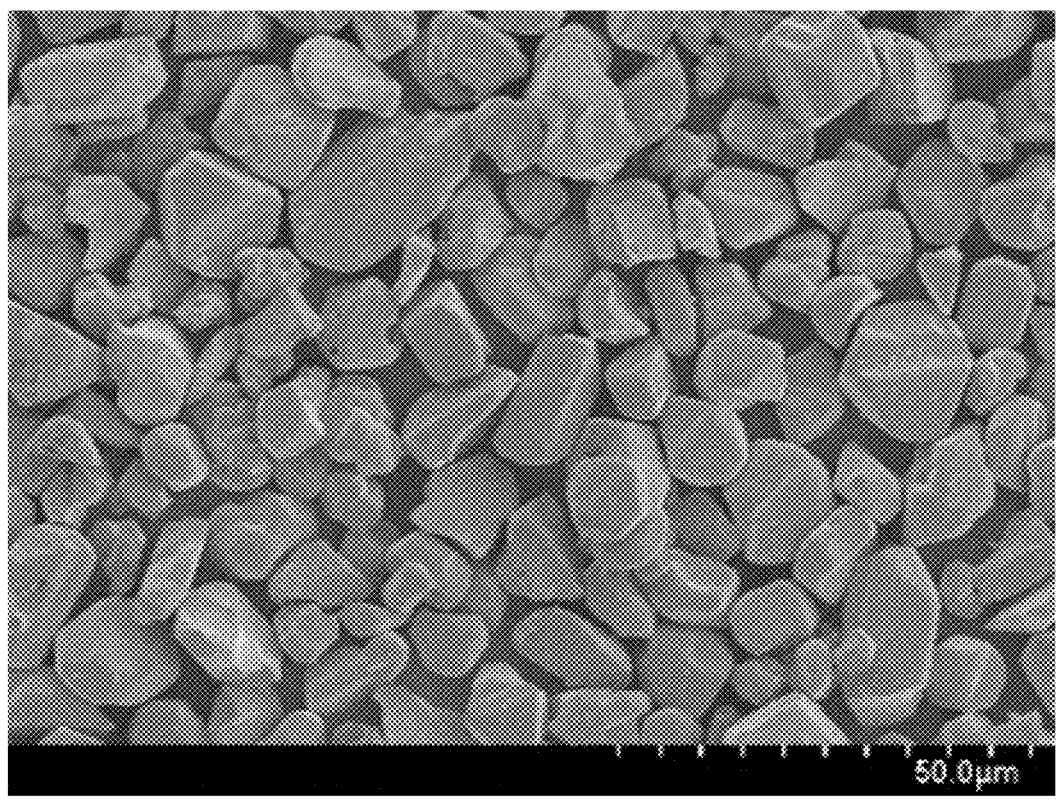
FIG. 3 is a SEM micrograph of the nitride fluorescent material of Example 2.
Figure 4:
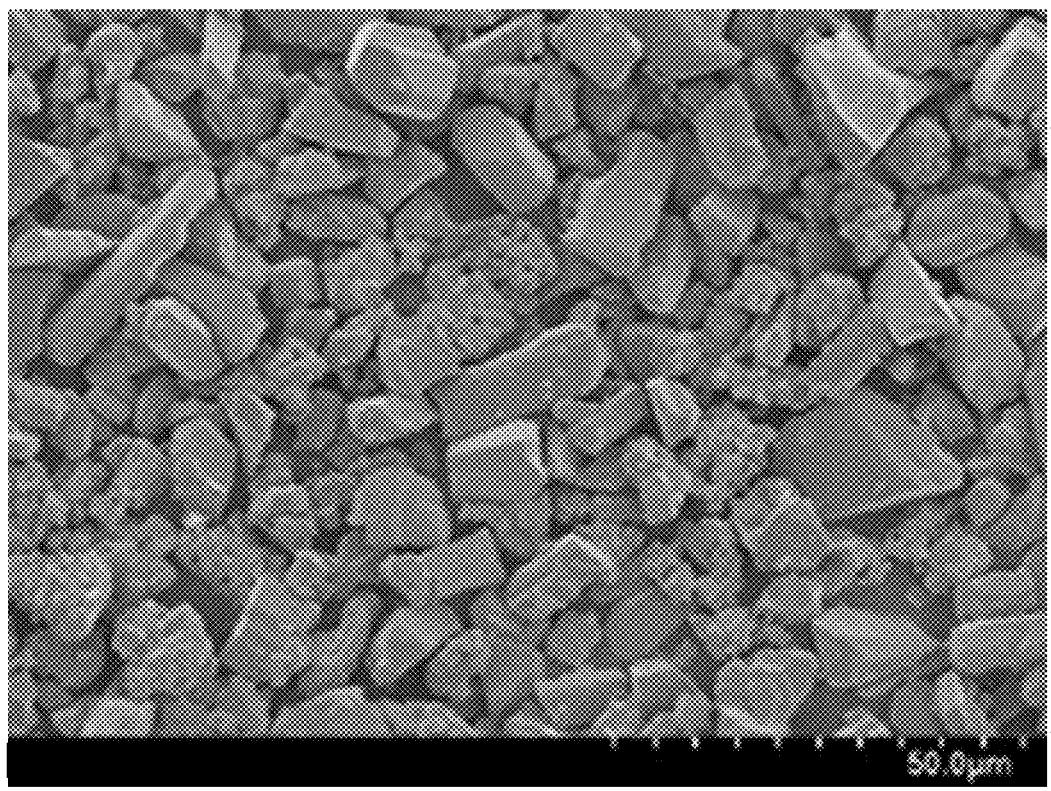
FIG. 4 is a SEM micrograph of the nitride fluorescent material of Comparative Example 1.

Using a scanning electron microscope (SEM), SEM images of the nitride fluorescent materials of Examples 1 and 2 and the nitride fluorescent material of Comparative Example 1 were taken. FIG. 2 is a SEM micrograph showing the nitride fluorescent material of Example 1, FIG. 3 is a SEM micrograph showing the nitride fluorescent material of Example 2, and FIG. 4 is a SEM micrograph showing the nitride fluorescent material of Comparative Example 1.

TABLE 1

| | Ratio of Charge-in Molar Amount of Ba (B1) | Ratio of Charge-in Molar Amount of Ba (B2) | FSSS Mean Particle Size/ Volume-Average Particle Size (N/Dm2) | FSSS Mean Particle Size (N) (μm) | Volume-Average Particle Size (Dm2) (μm) | Standard Deviation (σlog) | Emission Peak Wavelength (nm) | Yield (%) |
|---|---|---|---|---|---|---|---|---|
| Example 1 | 0.11 | 0.82 | 0.82 | 9.9 | 12.1 | 0.27 | 595 | 69 |
| Example 2 | 0.11 | 0.85 | 0.80 | 9.9 | 12.3 | 0.27 | 594 | 65 |
| Comparative Example 1 | — | 0.82 | 0.74 | 6.5 | 8.8 | 0.31 | 597 | 33 |
| Example 3 | 0.11 | 0.64 | 0.77 | 8.1 | 10.5 | 0.29 | 609 | 59 |
| Example 4 | 0.11 | 0.69 | 0.78 | 8.3 | 10.6 | 0.29 | 609 | 52 |
| Comparative Example 2 | — | 0.64 | 0.59 | 6.7 | 11.3 | 0.42 | 609 | 40 |

TABLE 2

| | Calcined Product of Raw Materials Charge-in Compositional Ratio (molar amount) | | | | Nitride Fluorescent Material | | | | | | | | | |
|---|---|---|---|---|---|---|---|---|---|---|---|---|---|---|
| | | | | | Charge-in Compositional Ratio (molar amount) | | | | Analytical Compositional Ratio (Molar Amount) | | | | | |
| | Ba | Sr | Eu | Si | Ba | Sr | Eu | Si | Ba | Sr | Eu | Si | N | O |
| Example 1 | 0.220 | 1.740 | 0.040 | 5.000 | 1.800 | 0.400 | 0.040 | 5.000 | 1.57 | 0.39 | 0.04 | 5.00 | 7.93 | 0.05 |
| Example 2 | 0.220 | 1.740 | 0.040 | 5.000 | 1.876 | 0.335 | 0.040 | 5.000 | 1.63 | 0.33 | 0.04 | 5.00 | 7.88 | 0.05 |
| Comparative Example 1 | — | — | — | — | 1.800 | 0.400 | 0.040 | 5.000 | 1.54 | 0.41 | 0.04 | 5.00 | 7.95 | 0.05 |

TABLE 2-continued

| | Calcined Product of Raw Materials | | | | Nitride Fluorescent Material | | | | | | | | | |
|---|---|---|---|---|---|---|---|---|---|---|---|---|---|---|
| | Charge-in Compositional Ratio (molar amount) | | | | Charge-in Compositional Ratio (molar amount) | | | | Analytical Compositional Ratio (Molar Amount) | | | | | |
| | Ba | Sr | Eu | Si | Ba | Sr | Eu | Si | Ba | Sr | Eu | Si | N | O |
| Example 3 | 0.220 | 1.740 | 0.040 | 5.000 | 1.250 | 0.710 | 0.040 | 5.000 | 1.09 | 0.79 | 0.05 | 5.00 | 7.76 | 0.07 |
| Example 4 | 0.220 | 1.740 | 0.040 | 5.000 | 1.358 | 0.603 | 0.040 | 5.000 | 1.25 | 0.63 | 0.04 | 5.00 | 7.81 | 0.07 |
| Comparative Example 2 | — | — | — | — | 1.250 | 0.710 | 0.040 | 5.000 | 1.14 | 0.71 | 0.04 | 5.00 | 7.65 | 0.06 |

As shown in Table 1, the nitride fluorescent materials of Examples 1 to 4 have a ratio N/Dm2 of more than 0.75. From the results, it is known that the nitride fluorescent material of Examples 1 to 4 have a low content of secondary particles and have a high content of primary particles, and the particle shape thereof is good.

The nitride fluorescent material of Example 1 and the nitride fluorescent material of Comparative Example 1 both produced with the same charge-in composition are compared with each other. Both the FSSS mean particle size (N) and the volume-average particle size (Dm2) of the nitride fluorescent material of Example 1 are larger than those of the nitride fluorescent material of Comparative Example 1. Also the nitride fluorescent material of Example 3 and the nitride fluorescent material of Comparative Example 2 both produced with the same charge-in composition are compared with each other. The FSSS mean particle size (N) of the nitride fluorescent material of Example 3 is larger than that of the nitride fluorescent material of Comparative Example 2.

In addition, the yield of the nitride fluorescent materials of Examples 1 and 2 is higher than the yield of the nitride fluorescent material of Comparative Example 1, and the yield of the nitride fluorescent materials of Examples 3 and 4 is higher than the yield of the nitride fluorescent material of Comparative Example 2.

From the results, it is confirmed that, since the ratio (B1) of the charge-in molar amount of Ba is smaller than the ratio (B2) of the charge-in molar amount of Ba in the nitride fluorescent material of Example 1, the fluorescent material was produced at a high yield, the particle size thereof is large and the particle shape thereof is good.

As shown in Table 2, the nitride fluorescent materials of Examples 1 to 4 using a calcined product of raw materials, and the nitride fluorescent materials of Comparative Examples 1 and 2 not using a calcined product of raw materials all had an almost intended composition though the compositional ratio of each element therein varied in some small measure.

With reference to FIG. 1, the particle size distribution of the nitride fluorescent materials of Examples 1 and 2 is described. Regarding the mean particle size of those nitride fluorescent materials, it is known that the mean particle size that gives a peak of volume frequency of those materials is larger than that of the nitride fluorescent material of Comparative Example 1, and the full width at half maximum of the particle size distribution of the former is narrower than that of the latter.

As in the SEM micrographs of FIG. 2 and FIG. 3, the nitride fluorescent material of Example 1 and the nitride fluorescent material of Example 2 do not contain secondary particles and almost all the particles therein are primary particles. These fluorescent materials do not contain particles having rough surfaces, and the particles in these have smooth surfaces, have a good particle shape and have a uniform particle size.

As opposed to these, in the nitride fluorescent material of Comparative Example 1, the particle size of the particles is not uniform, and the particles contain secondary particles formed through aggregation of fine particles and contain particles having rough surfaces, and the particle shape of the particles is not good, as shown in the SEM micrograph of FIG. 4.

The nitride fluorescent material obtained according to the production method of the present disclosure can be combined with a light emitting element and can be used in a broad field of ordinary lightings, in-car lightings, displays, backlights for liquid-crystal devices, traffic lights, illumination-type switches for lights, etc.

What is claimed is:

1. A method of producing a nitride fluorescent material, comprising:
   first heat-treating a first compound containing at least one alkaline earth metal element selected from the group consisting of Ba, Sr, and Ca, a second compound containing Eu, and a Si-containing compound, in an atmosphere containing nitrogen to obtain a calcined product of raw materials, and
   second heat-treating the calcined product of raw materials, a Ba-containing compound, a Si-containing compound, and optionally a third compound containing Eu, and optionally a fourth compound containing at least one alkaline earth metal element selected from the group consisting of Sr and Ca, in an atmosphere containing nitrogen to obtain a nitride fluorescent material, wherein:
   a ratio of a charge-in molar amount of Ba to a total charge-in molar amount of at least one alkaline earth metal element to be contained in the calcined product of raw materials in the step of obtaining the calcined product of raw materials is smaller than a ratio of a charge-in molar amount of Ba to a total charge-in molar amount of at least one alkaline earth metal element to be contained in the nitride fluorescent material in the step of obtaining the nitride fluorescent material,
   wherein the first compound comprises nitrides containing at least one alkaline earth metal element selected from the group consisting of Ba, Sr, and Ca, the second compound comprises nitrides containing Eu, and the Si-containing compound comprises a metal containing Si, or nitrides containing Si.

2. The method of producing a nitride fluorescent material according to claim 1, wherein:
   the ratio (B1) of the charge-in molar amount of Ba to the total charge-in molar amount of at least one alkaline earth metal element to be contained in the calcined product of raw materials is in a range of 0 or more and less than 0.3, and the ratio (B2) of the molar amount of Ba to the total charge-in molar amount of at least one alkaline earth metal element to be contained in the nitride fluorescent material is in a range of 0.3 or more and less than 1.0.

3. The method of producing a nitride fluorescent material according to claim 1, wherein:
the ratio (B1) of the charge-in molar amount of Ba to the total charge-in molar amount of at least one alkaline earth metal element to be contained in the calcined product of raw materials is in a range of 0.01 or more and 0.26 or less, and
the ratio (B2) of the molar amount of Ba to the total charge-in molar amount of at least one alkaline earth metal element to be contained in the nitride fluorescent material is in a range of 0.5 or more and 0.90 or less.

4. The method of producing a nitride fluorescent material according to claim 1, wherein the calcined product of raw materials has a charge-in composition represented by the following formula (I):

$$(Sr_qM a_sEu_t)_2Si_5N_8 \quad (I)$$

wherein M1 represents at least one alkaline earth metal element selected from the group consisting of Ba and Ca, and q, s and t each are numbers satisfying $0.600 \leq q \leq 0.999$, $0 \leq s \leq 0.3$, $0.001 \leq t \leq 0.100$, and $0.9 < q+s+t \leq 1.0$.

5. The method of producing a nitride fluorescent material according to claim 1, wherein the nitride fluorescent material has a composition represented by the following formula (II):

$$(Ba_vSr_wCa_xEu_y)_2Si_5N_{8-z} \quad (II)$$

wherein v, w, x, y and z each are numbers satisfying $0.300 \leq v \leq 0.899$, $0.100 \leq w \leq 0.700$, $0 \leq x \leq 0.6$, $0.001 \leq y \leq 0.100$, $0.9 < v+w+x \leq 1.0$, and $0.0 \leq z \leq 0.5$.

6. The method of producing a nitride fluorescent material according to claim 1, wherein a volume-average particle size (Dm1) of the calcined product of raw materials, as measured according to a laser diffraction scattering particle size distribution measuring method, is in a range of 5.0 μm or more and 20.0 μm or less.

7. The method of producing a nitride fluorescent material according to claim 1, wherein a mixture of raw materials comprises a chloride of a rare earth metal, an alkaline earth metal or an alkali metal, a fluoride of a rare earth metal, an alkaline earth metal or an alkali metal as a flux.

8. The method of producing a nitride fluorescent material according to claim 1, wherein the atmosphere containing nitrogen at the first heat-treating is an atmosphere containing nitrogen and a reductive hydrogen gas.

9. The method of producing a nitride fluorescent material according to claim 1, wherein a heat treatment temperature at the first heat-treating and/or the second heat-treating is in a range of 1300° C. or higher and 2100° C. or lower.

10. The method of producing a nitride fluorescent material according to claim 1, wherein the first heat-treating and/or the second heat-treating is multistage heat treatment of two stages or more.

11. The method of producing a nitride fluorescent material according to claim 1, wherein the first heat-treating and/or the second heat-treating is two-stage heat treatment, the first stage heat treatment is carried out at a temperature falling within a range of 1000° C. or lower and lower than 1500° C., and the second stage heat treatment is carried out at a temperature falling within a range of 1500° C. or higher and 2100° C. or lower.

12. The method of producing a nitride fluorescent material according to claim 1, wherein the pressure of the atmosphere containing nitrogen at the first heat-treating and/or the second heat-treating is, as a gauge pressure, in a range of 0.1 MPa or more and 200 MPa or less.

13. A nitride fluorescent material having a composition containing Ba; at least one alkaline earth metal element selected from the group consisting of Ca and Sr; Eu; Si; and N, wherein:
the ratio (N/Dm2) of a mean particle size (N) of the nitride fluorescent material measured according to a Fisher sub-sieve sizer (FSSS) method to a volume-average particle size (Dm2) of the nitride fluorescent material according to a laser diffraction scattering particle size distribution measuring method is in a range of 0.75 or more and 1.00 or less, and
wherein the standard deviation of the volume-based particle size distribution (clog) of the nitride fluorescent material, as measured according to a laser diffraction scattering particle size distribution measuring method, is 0.30 or less.

14. The nitride fluorescent material according to claim 13, wherein the nitride fluorescent material has a composition represented by the following formula (II):

$$(Ba_vSr_wCa_xEu_y)_2Si_5N_{8-z} \quad (II)$$

wherein v, w, x, y and z each are numbers satisfying $0.300 \leq v \leq 0.899$, $0.100 \leq w \leq 0.700$, $0 \leq x \leq 0.6$, $0.001 \leq y \leq 0.100$, $0.9 < v+w+x \leq 1.0$, and $0 \leq z \leq 0.5$.

15. The nitride fluorescent material according to claim 13, wherein the mean particle size (N) of the nitride fluorescent material, as measured according to the FSSS method, is in a range of 7.0 μm or more and 20.0 μm or less.

16. The nitride fluorescent material according to claim 13, wherein the volume-average particle size (Dm2) of the nitride fluorescent material is in a range of 8.0 μm or more and 20.0 μm or less.

17. The nitride fluorescent material according to claim 13, wherein the full width at half maximum of the emission spectrum of the nitride fluorescent material is 90 nm or less.

* * * * *